United States Patent
Oba

(10) Patent No.: US 10,504,051 B2
(45) Date of Patent: Dec. 10, 2019

(54) METHOD AND APPARATUS FOR POSTAL ADDRESS MATCHING

(71) Applicant: DMTI SPATIAL, INC., Richmond (CA)

(72) Inventor: Coskun Oba, Markham (CA)

(73) Assignee: DMTI SPATIAL, INC., Richmond (CA)

( * ) Notice: Subject to any disclaimer, the term of this patent is extended or adjusted under 35 U.S.C. 154(b) by 729 days.

(21) Appl. No.: 15/008,698

(22) Filed: Jan. 28, 2016

(65) Prior Publication Data

US 2017/0220975 A1  Aug. 3, 2017

(51) Int. Cl.
| | |
|---|---|
| *G06Q 20/08* | (2012.01) |
| *G06F 16/903* | (2019.01) |
| *G06F 16/31* | (2019.01) |
| *G06F 7/02* | (2006.01) |
| *G06Q 10/08* | (2012.01) |

(52) U.S. Cl.
CPC ......... *G06Q 10/083* (2013.01); *G06F 16/316* (2019.01); *G06F 16/90344* (2019.01)

(58) Field of Classification Search
CPC ......... G06F 17/30985; G06F 16/90344; G06F 16/316; G06Q 10/083
See application file for complete search history.

(56) References Cited

U.S. PATENT DOCUMENTS

| | | | |
|---|---|---|---|
| 7,296,011 B2 | 11/2007 | Chaudhuri et al. | |
| 2002/0124015 A1 | 9/2002 | Cardno et al. | |
| 2002/0174148 A1* | 11/2002 | Seidman | G06F 17/211 715/249 |
| 2004/0260694 A1* | 12/2004 | Chaudhuri | G06F 17/30542 |
| 2010/0325136 A1* | 12/2010 | Chaudhuri | G06F 17/276 707/759 |
| 2012/0265778 A1* | 10/2012 | Chen | G06F 16/322 707/765 |
| 2012/0303663 A1 | 11/2012 | Asikainen et al. | |
| 2013/0311448 A1* | 11/2013 | Thompson | G06F 16/24578 707/722 |
| 2016/0224992 A1 | 8/2016 | Powell | |
| 2017/0220600 A1 | 8/2017 | Bashir et al. | |
| 2017/0220702 A1 | 8/2017 | Rabenok | |

OTHER PUBLICATIONS

Wang, Extending String Similarity Join to Tolerant Fuzzy Token Matching, Jan. 2014, ACM Transactions on Database Systems, vol. 39, No. 1, Article 7, (Year: 2014).*

(Continued)

*Primary Examiner* — Kevin H Flynn
*Assistant Examiner* — Ismail A Manejwala
(74) *Attorney, Agent, or Firm* — Choate, Hall & Stewart LLP

(57) ABSTRACT

Provided are methods and apparatus for matching postal addresses. In an example, provided is a method for comparing postal addresses. The method includes receiving a first postal address, standardizing the form of the first postal address, removing a component of the first postal address to create a canonical representation of the first postal address, and utilizing a signature-based algorithm to identify at least one stored signature which substantially matches the first postal address.

20 Claims, 6 Drawing Sheets

(56) References Cited

OTHER PUBLICATIONS

Anonymous: "Nikita's blog: Fuzzy string search", Retrieved from the Internet: URL: ntz-develop.blogspot.com/2011/03/fuzzy-string-search.html [ret. on Mar. 24, 2017].
Extended European Search Report dated Jun. 4, 2017 as received in Application No. 17153492.8.
Wang, et al., "Fast-Join: An Efficient Method for Fuzzy Token Matching based String Similarity Join", FastJoin Article—Tsinghua National Laboratory for Information Science and Technology, Department of Computer Science and Technology, Tsinghua University, Beijing 10084, China, 12 pgs.
Canadian Office Action for CA Application 2,956,158 (Method and Apparatus for Postal Address Matching, filed Jan. 26, 2017) 6 pages (dated Nov. 26, 2018).
File History of U.S. Appl. No. 14/610,712, 118 pages.
File History of U.S. Appl. No. 15/008,675, 86 pages.
File History of U.S. Appl. No. 15/010,745, 86 pages.
Canadian Office Action for Application No. 2,956,158 (Method and Apparatus for Postal Address Matching), 4 pages, dated Dec. 11, 2017.
Wang, J. et al, Extending String Similarity Join to Tolerant Fuzzy Token Matching, ACM Transactions on Database Systems, 39(1): Article 7, 45 pages (2014).
Canadian Office Action for CA Application No. 2,956,243 (Method and Apparatus for Identifying One or More Territories, filed Jan. 26, 2017) 6 pages (dated Sep. 25, 2018).

\* cited by examiner

METHOD AND APPARATUS FOR POSTAL ADDRESS MATCHING

FIELD OF DISCLOSURE

This disclosure relates generally to electronics, and more specifically, but not exclusively, to methods and apparatus which match postal addresses.

BACKGROUND

Conventional techniques implement brute-force algorithms to compare two postal addresses and identify matching addresses. The brute-force algorithms enumerate data in a postal address and directly check the enumerated data against data in the other postal address. Some conventional techniques require a perfect match between the data in the two postal addresses to produce a "match" result. However, the conventional techniques also erroneously reject sufficient "near-matches." Rejected near-matches can occur when there is a minor error in one of the postal addresses, such as a misspelling of a name, which prevents the brute-force algorithms from identifying a perfect match. Other conventional techniques require a high level of complication to produce high accuracy.

SUMMARY

This summary provides a basic understanding of some aspects of the present teachings. This summary is not exhaustive in detail, and is neither intended to identify all critical features, nor intended to limit the scope of the claims.

In an example, a method for comparing postal addresses is provided. The method can be at least a part of an address cleansing process, an address validating process, the like, or a practicable combination thereof. Address cleansing can detect errors in addresses, detect stale addresses, detect formatting errors, the like, correct these errors, or a practicable combination thereof. The method includes receiving a first postal address, forming a token set from at least a portion of the first postal address, and creating a postal address signature from the token set. The method can also include receiving the first postal address via a computer network, from a computer, a mobile device, a wearable device, a cloud-based computer network, or a combination thereof. The postal address signature is a fuzzy-token based signature. The token set can be formed at least in part from a street name, a city name, or a combination thereof. The postal address signature can be a q-gram based signature and "q" is a number equal to or greater than two. The postal address signature can be a partition-NED (Normalized Edit Distance) based signature. Edit distance (ED) is a minimum number of single-character edit operations (e.g., insertion, deletion, substitution, and the like) to transform one string to another string. The postal address signature can be a Deletion-Based neighborhood generation algorithm-based signature, an A O(log n) Signature-Based String Matching Algorithm-based signature, an AdaptJoin algorithm-based signature, a VChunk algorithm-based signature, a PassJoin algorithm-based signature, a FastSS algorithm-based signature, an ExB: Exclusion-based string matching algorithm-based signature, a Part-Enum algorithm-based signature, or a Partition-ED algorithm-based signature. The method also includes identifying a matching signature by comparing the postal address signature to at least one stored signature in a plurality of stored signatures, identifying a second postal address corresponding to the matching signature, and identifying a match between the first postal address and the second postal address based on the matching signature. The identifying of the match can include comparing the at least one removed component to a corresponding component of the second postal address. The identifying of the match can include comparing the at least one removed component to a corresponding component of the second postal address. The method can also include removing at least one component of the first postal address prior to the forming the token set. The at least one component of the first postal address can be a street address, a postal code, or a combination thereof. The postal code can be a zip code. The method can include standardizing, prior to creating the token set, a component in the first postal address. The standardizing can be to a country-specific standard. The method can also include correcting a misspelling in the first postal address prior to creating the postal address signature.

In a further example, provided is a non-transitory computer-readable medium, including processor-executable instructions stored thereon. The processor-executable instructions are configured to cause a processor to initiate executing one or more parts of the aforementioned method. The non-transitory computer-readable medium can be integrated with a computing device.

In another example, provided is a first apparatus configured to compare postal addresses. The first apparatus includes means for receiving a first postal address, means for forming a token set from at least a portion of the first postal address, and means for creating a postal address signature from the token set. The means for receiving the first postal address can include means for receiving the first postal address via a computer network, from a computer, a mobile device, a wearable device, a cloud-based computer network, or a combination thereof. The at least one component of the first postal address can be a street address, a postal code, or a combination thereof. The postal code can be a zip code. The first apparatus can also include means for removing at least one component of the first postal address prior to the forming the token set. The first apparatus can also include means for standardizing, prior to creating the token set, a component in the first postal address. The standardizing can be to a country-specific standard. The token set can be formed at least in part from a street name, a city name, or a combination thereof. The first apparatus can also include means for correcting a misspelling in the first postal address prior to creating the postal address signature. The postal address signature is a fuzzy-token based signature. The postal address signature can be a q-gram based signature and "q" is a number equal to or greater than two. The postal address signature can be a partition-NED based signature. The postal address signature can be a Deletion-Based neighborhood generation algorithm-based signature, an A O(log n) Signature-Based String Matching Algorithm-based signature, an AdaptJoin algorithm-based signature, a VChunk algorithm-based signature, a PassJoin algorithm-based signature, a FastSS algorithm-based signature, an ExB: Exclusion-based string matching algorithm-based signature, a Part-Enum algorithm-based signature, or a Partition-ED algorithm-based signature. The first apparatus also includes means for identifying a matching signature by comparing the postal address signature to at least one stored signature in a plurality of stored signatures, means for identifying a second postal address corresponding to the matching signature, and means for identifying a match between the first postal address and the second postal address based on the matching signature. The means for identifying a second postal address can be at least a part of a device configured to perform an address cleansing process, an address validating process, or a combination thereof. The first apparatus can also include a computing device, with which the means for identifying the second postal address is a constituent part. The means for identifying the match can further comprises means for comparing the at least one removed component to a corresponding component of the second postal address.

In another example, provided is a second apparatus configured to compare postal addresses. The second apparatus includes a processor and a memory coupled to the processor. The memory is configured to cause the processor to create specific logic circuits within the processor. The memory can be configured to cause the processor to initiate creating specific logic circuits configured to cause the processor to initiate performing the identifying the second postal address as a part of an address cleansing process, an address validating process, or a combination thereof. The specific logic circuits are configured to cause the processor to initiate receiving a first postal address, initiate forming a token set from at least a portion of the first postal address, and initiate creating a postal address signature from the token set. The memory can be configured to cause the processor to initiate creating specific logic circuits configured to cause the processor to initiate receiving the first postal address via a computer network, from a computer, a mobile device, a wearable device, a cloud-based computer network, or a combination thereof. The memory can be configured to cause the processor to initiate creating specific logic circuits configured to initiate causing the processor to form the token set at least in part from a street name, a city name, or a combination thereof. The memory can be configured to cause the processor to initiate creating specific logic circuits configured to initiate causing the processor to correct a misspelling in the first postal address prior to creating the postal address signature. The memory can be configured to cause the processor to initiate creating specific logic circuits configured to cause the processor to initiate standardizing, prior to creating the token set, a component in the first postal address. The standardizing can be to a country-specific standard. The postal address signature is a fuzzy-token based signature. The postal address signature can be a q-gram based signature and "q" is a number equal to or greater than two. The postal address signature can be a partition-NED based signature. The specific logic circuits are configured to cause the processor to initiate identifying a matching signature by comparing the postal address signature to at least one stored signature in a plurality of stored signatures, initiate identifying a second postal address corresponding to the matching signature, and initiate identifying a match between the first postal address and the second postal address based on the matching signature. The memory can be configured to cause the processor to initiate creating specific logic circuits configured to cause the processor to initiate removing at least one component of the first postal address prior to the forming the token set. The at least one component of the first postal address can be a street address, a postal code, or a combination thereof. The postal code can be a zip code. The memory can be configured to cause the processor to initiate creating specific logic circuits configured to cause the processor to initiate performing the identifying the match by initiating comparing the at least one removed component to a corresponding component of the second postal address. The second apparatus can include a computing device with which the processor is integrated. The processor can be a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, or a combination thereof.

The foregoing broadly outlines some of the features and technical advantages of the present teachings so the detailed description and drawings can be better understood. Additional features and advantages are also described in the detailed description. The conception and disclosed examples can be used as a basis for modifying or designing other devices for carrying out the same purposes of the present teachings. Such equivalent constructions do not depart from the technology of the teachings as set forth in the claims. The inventive features characteristic of the teachings, together with further objects and advantages, are better understood from the detailed description and the accompanying drawings. Each of the drawings is provided for the purpose of illustration and description only, and does not limit the present teachings.

BRIEF DESCRIPTION OF THE DRAWINGS

The accompanying drawings are presented to describe examples of the present teachings, and are not limiting.

Figure 1A:
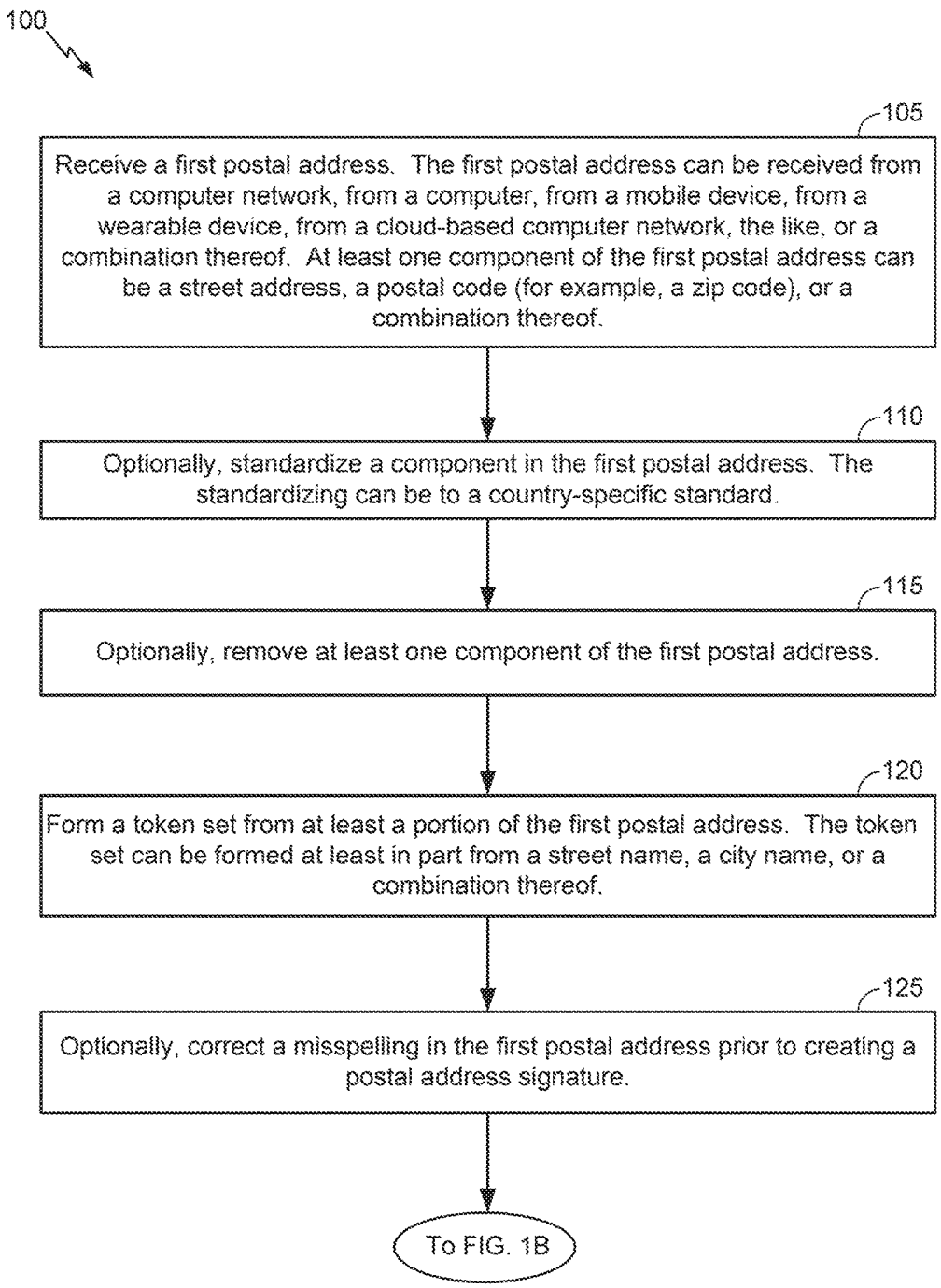
FIGS. 1A-1B depict an example method for comparing postal addresses.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Methods and apparatuses for comparing data are provided. Examples of the provided methods and apparatus can find substantially similar string pairs from collections of strings. In an example, the strings are two sets of postal addresses. When compared to conventional techniques, the provided methods and apparatus are more efficient, faster, and cost less to implement.

The following documents are incorporated by reference into this disclosure: "Fast-Join: An Efficient Method for Fuzzy Token Matching based Similarity Join" by Jiannan Wang, Guoliang Li, and Jianhua Feng, 2011 IEEE International Conference on Data Engineering, pages 458-469 (11-16 Apr. 2011) (ISSN: 106306382); and "Extending string similarity join to tolerant fuzzy token matching" by Jiannan Wang, Guoliang Li, and Jianhua Feng, Association for Computing Machinery Transactions on Database Systems, Volume 39, Number 1, Article 7 (January, 2014) (DOI: http://dx.doi.org/10.1145/2535628).

Figure 1B:
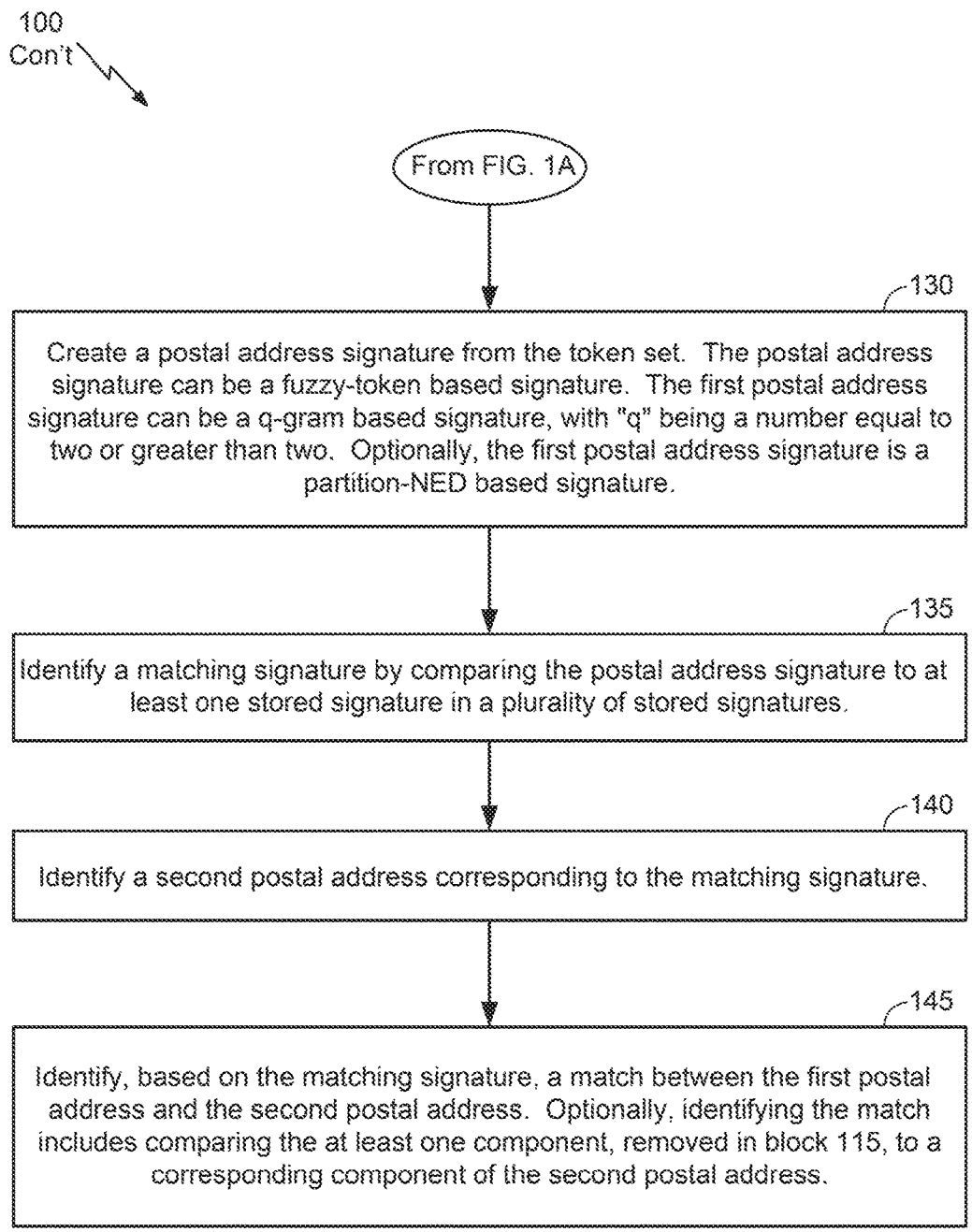

FIGS. 1A-1B depict an example method 100 for comparing postal addresses. The method 100 can implement a fuzzy token similarity algorithm. Fuzzy token similarity combines token-based similarity and character-based similarity. Fuzzy token similarity computes a fuzzy overlap by considering a degree of fuzzy match between tokens. Given two token sets, fuzzy token similarity uses a character-based similarity of token pairs from the two sets by 1) computing an edit similarity of each token pair from the two sets, and 2) using maximum weight matching in bipartite graphs to compute fuzzy overlap.

Figure 3:
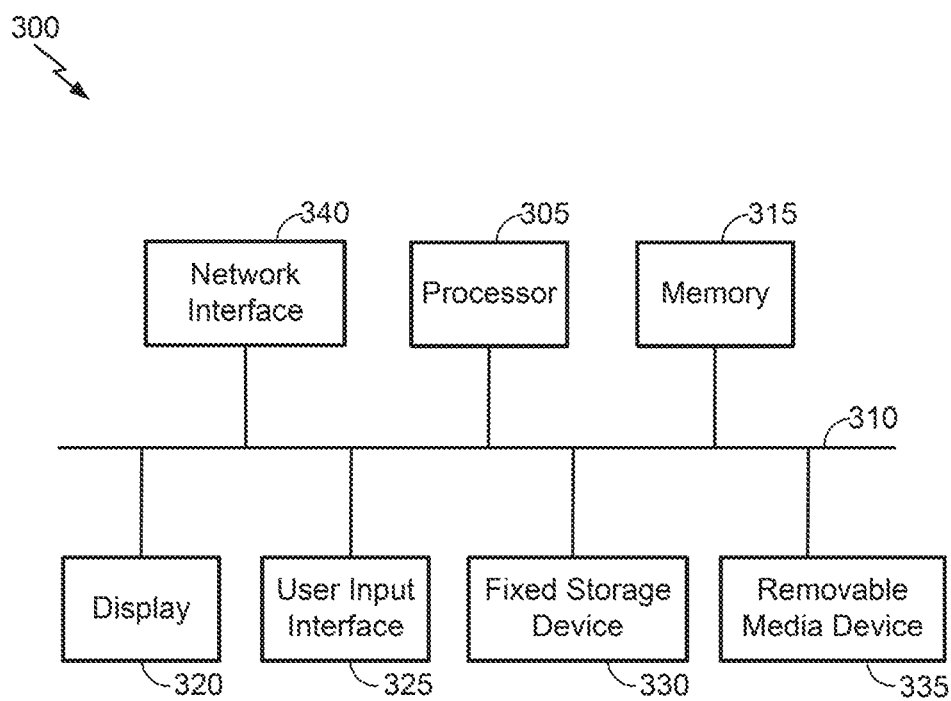
FIG. 3 depicts an example computing device.
Figure 4:
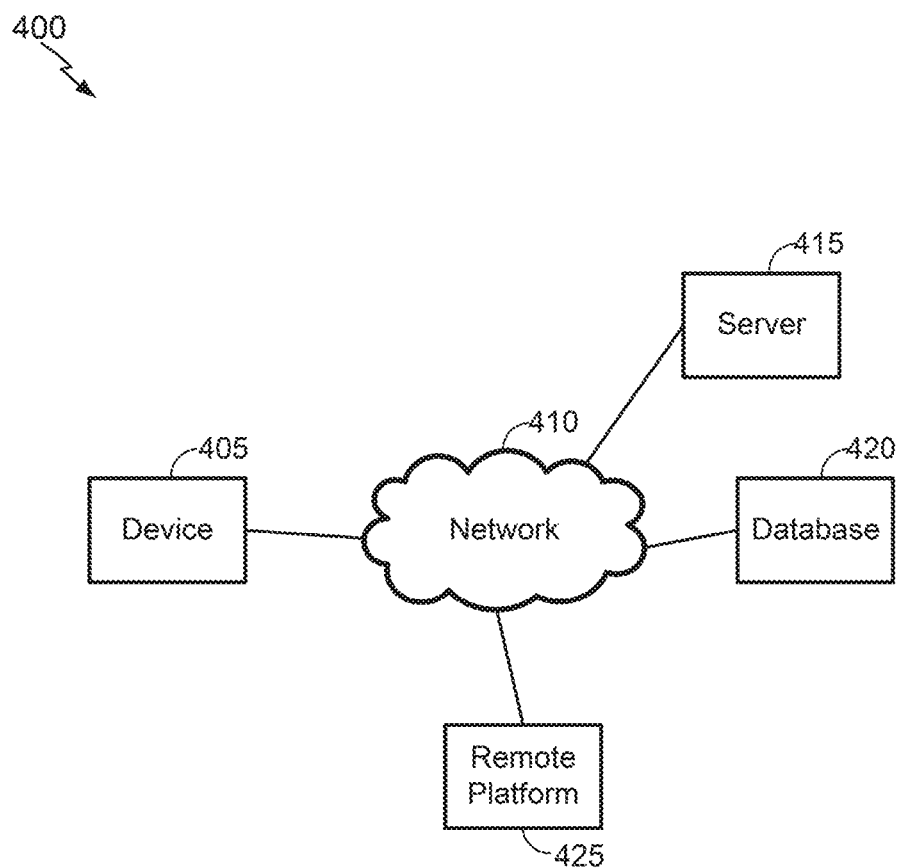
FIG. 4 depicts an example network.

The method 100 can be performed by the apparatus described hereby, such as a computing device 300 (as depicted in FIG. 3), an electronic device 405 (as depicted in FIG. 4), a server 415 (as depicted in FIG. 4), a remote platform 425 (as depicted in FIG. 4), the like, or a combination thereof. The method 100 can be at least a part of an address cleansing process, an address validating process, a data cleansing process, a data integration process, or a combination thereof. The method 100 can be implemented in different countries. For example, the method for comparing postal addresses 100 can be implemented in countries using a Latin-based character set, a ISO/IEC-compatible character set, a UTF-8-compatible character set, a character-based language, the like, or a combination thereof.

In block 105, a first postal address is received. The first postal address can be received from a computer network, from a computer, from a mobile device, from a wearable device, from a cloud-based computer network, the like, or a combination thereof.

The first postal address can include one or more components such as a street address, a postal code (for example, a zip code, a postcode, a codes postaux, a post code, an Eircode, a postal routing number, a Postal Index Number, a Codice di Avviamento Postale, a Código de Endereçamento Postal, a Postleitzahl, a postal zone code, a postal district code, the like, or a practicable combination thereof), a post office box number, a mailing address, a physical address, the like, or a combination thereof.

In optional block 110, a component in the first postal address is standardized prior to performing block 115. The standardizing can be done to meet a country-specific standard, at least a portion of a postal standard of a country, a postal standard of a region within a country, a commonly-used address format of a country, a commonly-used address format of a region within a country, the like, or a practicable combination thereof. For example, an abbreviation of a term can be replaced with the corresponding term, such as replacing the abbreviation of the term "street," which is "St." with the term "street." The standardization can convert at least a portion of the first postal address (i.e., a street name) to all capital letters.

In an example, the first postal address can have a standard format, can be standardized to a standard format, or both. Non-limiting examples of postal address formats follow. In these examples, brackets indicate an optional term (for example: [Street Type] is optional). Further, a term without brackets is preferable to include, but may not be present in a postal address. In an example, at least a portion of a format of a postal address such as the first postal address can include any of the following:

[Unit_Number]
[Street_Number] [Street_Type] Street_Name [Street_Direction]
Locality Province_Abbreviation
Postal_Code
Country
Street_Number Street_Name [Street_Type]
[Street_Direction] [Floor] [Unit_Number]
Locality State_Abbreviation Postal_Code
Country
[Unit_Number] [Building_Name]

-continued

Street_Number [Street_Type] Street_Name
Postal_Code Locality
Country
Street_Name Street_Number
Postal_Code Locality
Country
[Unit_Number]
[Building_Name]
[Street Number] Street_Name
[Locality]
Postal_Code
Country
PO BOX [Box Number]
P.O. BOX [Box Number]

A postal address such as the first postal address can also have a format conforming to at least a portion of a postal standard of a country, a postal standard of a region within a country, a commonly-used address format of a country, a commonly-used address format of a region within a country the like, or a practicable combination thereof.

In optional block 115, at least one component of the first postal address is removed prior to performing block 120. For example, a street number can be removed from the first postal address, to enable creating a signature for a street, rather than every address on the street. A postal code can be removed. The removed component can be stored for later use.

In block 120, a token set is formed from at least a portion of the first postal address. The token set can be formed at least in part from a street name, a city name, or a combination thereof. Including numerical components of the first postal address in the token set is optional.

In optional block 125, a misspelling in the first postal address is corrected prior to creating a postal address signature. Optional block 125 can be performed any time after performing block 105 and before performing block 130 in different examples. In an example, correcting misspellings are limited to certain address components. If two address records are very similar, but valid, a minor correction can be performed to prevent an error. As an example, street types can be changed. For example, given the following addresses:

1) 10 APPLE STREET MARKHAM ON
2) 10 APPLE STRET MARKHAM ON

The misspelling of "stret" is corrected to "street," and both addresses are standardized as 10 APPLE ST MARKHAM ON. Thus, the addresses can be combined, so only one address remains.

However all potential misspellings are not necessarily corrected. As an example, street names need not be changed. For example, given the following addresses:

1) 10 APPLE STREET MARKHAM ON
2) 10 APPLA STREET MARKHAM ON

It is possible that "Appla" is a correct street name, and is not misspelled. In this case, the street name is not changed. Thus, there are two records in this case:

1) 10 APPLE STREET MARKHAM ON
2) 10 APPLA STREET MARKHAM ON

In block 130, a postal address signature is created from the token set. The postal address signature can be a fuzzy-token based signature. The postal address signature can be a q-gram based signature, with "q" being a number equal to or greater than two. Optionally, the postal address signature is a partition-NED based signature. In an example, capital letters can be replaced with lower-case letters to improve a probability of a match. The postal address signature can be created with other algorithms, such as a Deletion-Based neighborhood generation algorithm, an A O(log n) Signature-Based String Matching Algorithm, an AdaptJoin algorithm, a VChunk algorithm, a PassJoin algorithm, a FastSS algorithm, an ExB: Exclusion-based string matching algorithm, a Part-Enum algorithm, a Partition-ED algorithm, a Partition-NED algorithm, the like, or a combination thereof. Example implementations can be case-sensitive or case-insensitive. Further, duplicative tokens can be removed from the postal address signature to shorten the postal address signature, reduce a data set size, and reduce processing time.

In block 135, a matching signature is identified by comparing the postal address signature to at least one stored signature in a plurality of stored signatures. The stored signature which is the closest match to the postal address signature can be identified as the matching signature. The plurality of stored signatures can optionally include a numerical component as a token, can include a numerical component as being in addition to the tokens of the stored signature, or a combination thereof. The type of stored signatures representing the stored postal address records are algorithm-specific. In the q-gram example below, the plurality of stored signatures are based on the q-gram algorithm.

In an example, the matching signature is identified based on comparing the intersecting of the postal address signature to the at least one stored signature in a plurality of stored signatures. If the number of intersecting tokens is greater than a constant "c," a match exists. The constant "c" can be determined using a Fuzzy-Dice Similarity calculation, a Fuzzy-Cosine Similarity calculation, a Fuzzy-Jaccard Similarity calculation, the like, or a combination thereof. In examples, the matching signature identification can be case-sensitive or case-insensitive.

In an example, the comparing includes a filter step and a refining step. In the filter step, candidates of similar pairs are generated based on signatures. An inverted index can be used to generate candidates. For example, given token sets T1, T2, T3 and T4 with:

Sig(T1)={ad, ac, dc},
Sig(T2)={be, cf, em},
Sig(T3)={ad, ab, ac},
Sig(T4)={bm, cf, be}

The inverted list of ad is {T1, T3}. Thus (T1, T3) is a set of candidate matches. As there is no signature whose inverted list contains both T1 and T2, thus T1 and T2 are dissimilar and can be pruned. The refining step verifies the set of candidate matches to generate the final results. Given two token sets T1 and T2, a weighted bigraph is constructed. As it is expensive to compute the maximum weighted matching, an upper bound of the maximal weight can be computed by relaxing the matching condition, such as by allowing the edges in the graph to share a common vertex. This upper bound is computed by summing the maximum weights of edges of every token in T1 (or T2). The pair can be pruned if the upper bound makes $F_\delta(T1, T2)$ smaller than $\tau$, (T1, T2), where $F_\delta$ is a token similarity threshold for a specific signature scheme F, and $\tau$ is an overall string similarity threshold (e. g., a minimum acceptable amount of matching).

In block 140, a second postal address corresponding to the matching signature is identified. The identification is based on the comparison results from block 135.

In block 145, a match between the first postal address and the second postal address is identified. The match is identified based on the matching signature. Optionally, identifying the match includes comparing the at least one component, removed in block 115, to a corresponding component of the second postal address. This optional technique can be performed using a direct comparison between the first postal address (including the removed component) and a list of second postal addresses having both matching signatures and respective corresponding components.

In an example, the matching addresses can be displayed with a video display. The display can depict the matching address on a map, in a table, the like, or a combination thereof.

The method 100 for comparing postal addresses can be implemented in a scalable manner, and multiple instances can be implemented concurrently (with each instance comparing the first postal address against different pluralities of stored signatures. A dispatching engine route the first postal address for processing by a specific instance of the method for comparing postal addresses 100. The dispatching engine can use an index correlating signatures to the specific instance of the method 100 for comparing postal addresses.

The foregoing blocks are not limiting of the examples. The blocks can be combined and/or the order can be rearranged, as practicable.

The following describes a simplified example implementation of the method 100, using a q-gram algorithm. A first postal address of "Markham 99 Apple Street" is received and standardized to "99 Apple Street Markham." The numerical portion "99" can be removed and is stored, thus making the first postal address "Apple Street Markham." A token set can be formed from "Apple Street Markham." In this example, the token set is {Apple, Street, Markham}. If the first postal address included a misspelling such as "Stret" instead of "Street" then the misspelling can be detected prior to creating a postal address signature. If a 2-gram set of tokens (i.e., bi-grams) is prepared, the bi-grams for the example are:

"Apple"={Ap, pp, pl, le}
"Street"={St, tr, re, ee, et}
"Markham"={Ma, ar, rk, kh, ha, am}.

Thus, if bi-grams are prepared, the postal address signature for the example is: {Ap, pp, pl, le, St, tr, re, ee, et, Ma, ar, rk, kh, ha, am}. Using the bi-grams provides higher accuracy than using a q-gram set where q is greater than or equal to three. Further, if a 3-gram set is prepared, the tri-grams for the example are:

"Apple"={App, ppl, ple}
"Street"={Str, tre, ree, eet}
"Markham"={Mar, ark, rkh, kha, ham}.

Thus, if a tri-gram set of tokens is prepared, the postal address signature for the example is: {App, ppl, ple, Str, tre, ree, eet, Mar, ark, rkh, kha, ham}. Using the tri-gram set enables faster processing than using a q-gram set where q is less than three.

An example plurality of stored signatures can include bi-gram signatures:

104 Pear Street Markham={Pe, ea, ar, St, tr, re, ee, et, Ma, ar, rk, kh, ha, am} with a numerical component of 104.

94 Apple Street Markham={Ap, pp, pl, le, St, tr, re, ee, et, Ma, ar, rk, kh, ha, am} with a numerical component of 94.

99 Apple Street Markham={Ap, pp, pl, le, St, tr, re, ee, et, Ma, ar, rk, kh, ha, am} with a numerical component of 99.

64 Orange Street Markham={Or, ra, an, ng, ge, St, tr, re, ee, et, Ma, ar, rk, kh, ha, am} with a numerical component of 64.

65 Orange Street Markham={Or, ra, an, ng, ge, St, tr, re, ee, et, Ma, ar, rk, kh, ha, am} with a numerical component of 65.

43 Apple Street Ottawa={Ap, pp, pl, le, St, tr, re, ee, et, Ot, tt, ta, aw, wa} with a numerical component of 43.

99 Orange Street Ottawa={Or, ra, an, ng, ge, St, tr, re, ee, et, Ot, tt, ta, aw, wa} with a numerical component of 99.

104 Orange Street Ottawa={Or, ra, an, ng, ge, St, tr, re, ee, et, Ot, tt, ta, aw, wa} with a numerical component of 104.

Comparing the postal address signature ({Ap, pp, pl, le, St, tr, re, ee, et, Ma, ar, rk, kh, ha, am}), which has fifteen bi-grams, with stored signatures of the plurality of stored signatures provides that the stored signature of {Ap, pp, pl, le, St, tr, re, ee, et, Ma, ar, rk, kh, ha, am} is the closest match, thus {Ap, pp, pl, le, St, tr, re, ee, et, Ma, ar, rk, kh, ha, am} is chosen as the matching signature.

The matching signature of {Ap, pp, pl, le, St, tr, re, ee, et, Ma, ar, rk, kh, ha, am} corresponds to a stored address of "Apple Street Markham." Thus, the stored address of "Apple Street Markham" is identified as the second postal address.

The first postal address of "Apple Street Markham" is compared with the second postal address of "Apple Street Markham" to identify a match between the two addresses. Optionally, if a numerical component, such as "99" was removed from the first postal address, then the removed component "99" can be compared to the numerical components of the stored signatures which are also matching signatures. Thus, the "99" of the first postal address can be compared to the "94" of "94 Apple Street Markham" and the "99" of "99 Apple Street Markham" to yield a match between the first postal address and the second postal address of "99 Apple Street Markham."

In another example, the removed component "99" can be restored to the first postal address prior to using a direct comparison between the first postal address (including the removed component) and a list of second postal addresses having both matching signatures and respective corresponding components. The resultant "99 Apple Street Markham" is directly compared to a list of second postal addresses having both matching signatures and respective corresponding numerical components: "94 Apple Street Markham" and "99 Apple Street Markham." The direct comparison yields a best match of "99 Apple Street Markham."

Figure 2A:
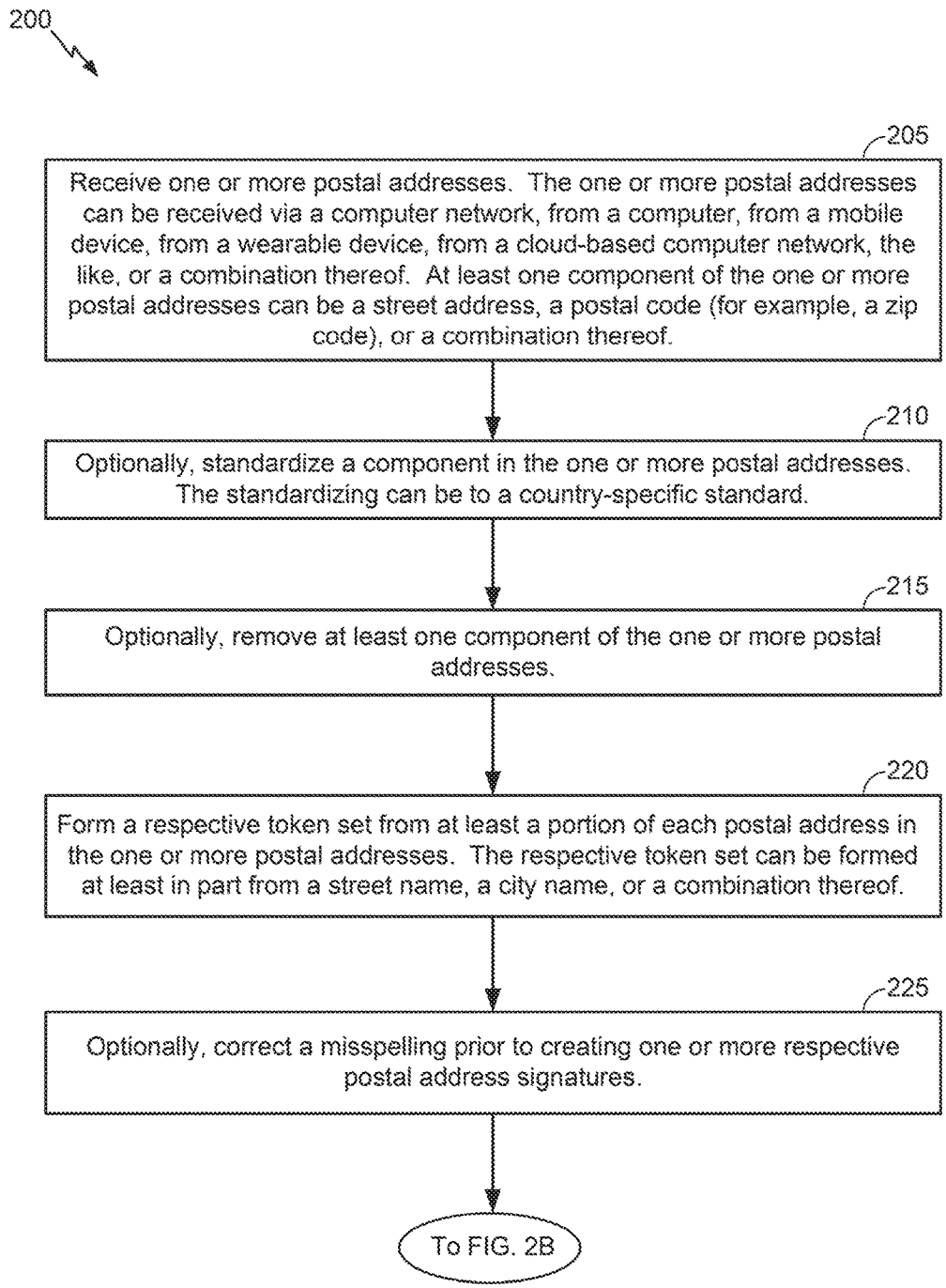
FIGS. 2A-2B depict an example method for preparing a plurality of stored signatures.
Figure 2B:
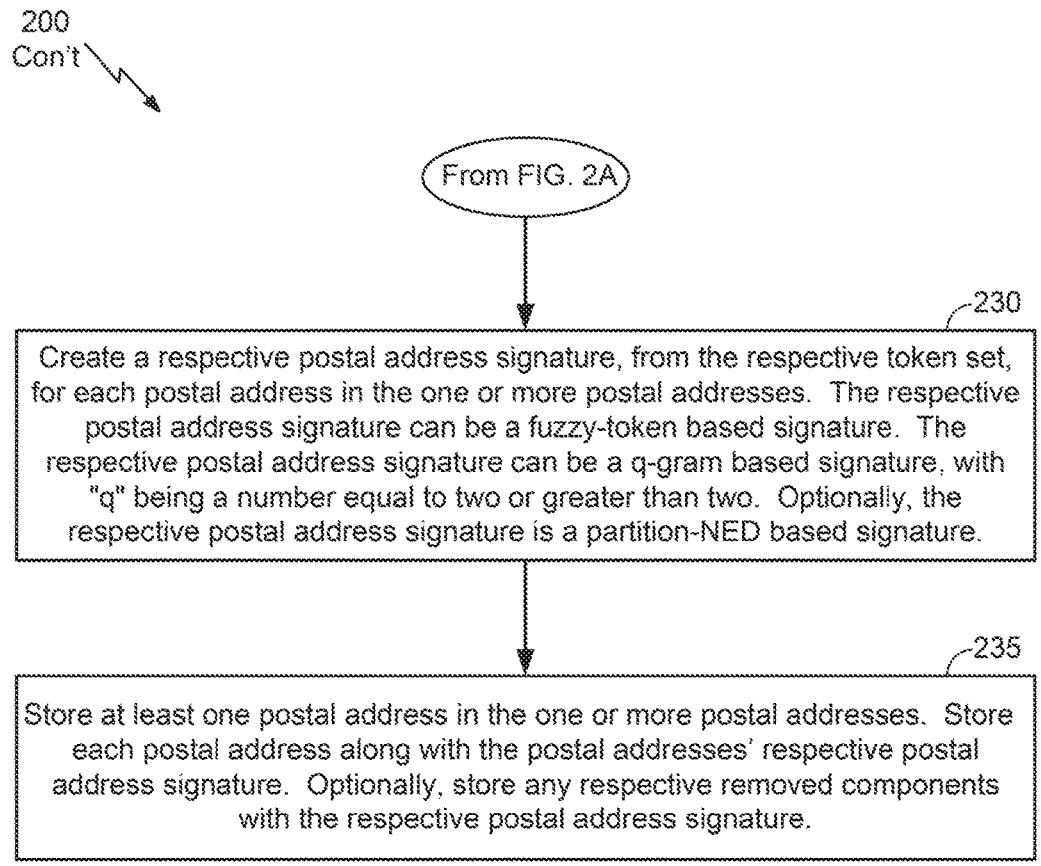

FIGS. 2A-2B depict an example method for preparing a plurality of stored signatures 200. The method for preparing a plurality of stored signatures 200 can be performed by the apparatus described hereby, such as a computing device 300 (as depicted in FIG. 3), an electronic device 405 (as depicted in FIG. 4), a server 415 (as depicted in FIG. 4), a remote platform 425 (as depicted in FIG. 4), the like, or a combination thereof. The method for comparing postal addresses 200 can be at least a part of an address cleansing process, an address validating process, or a combination thereof. The method for comparing postal addresses 200 can be implemented in different countries. For example, the method for comparing postal addresses 200 can be implemented in countries using a Latin-based character set, a ISO/IEC-compatible character set, a UTF-8-compatible character set, a character-based language, the like, or a combination thereof.

In block 205, one or more postal addresses are received. The one or more postal addresses can be received via a computer network, from a computer, from a mobile device, from a wearable device, from a cloud-based computer network, the like, or a combination thereof.

The one or more postal addresses can include one or more components such as a street address, a postal code (for example, a zip code, a postcode, a codes postaux, a post code, an Eircode, a postal routing number, a Postal Index Number, a Codice di Avviamento Postale, a Codigo de Enderecamento Postal, a Postleitzahl, a postal zone code, a postal district code, the like, or a practicable combination thereof), a post office box number, a mailing address, a physical address, the like, or a combination thereof. In an example, the one or more postal addresses can have a standard format, as described herein. The one or more postal addresses can also have a format conforming to at least a portion of a postal standard of a country, a postal standard of a region within a country, a commonly-used address format of a country, a commonly-used address format of a region within a country, the like, or a practicable combination thereof.

In optional block 210, a component in the one or more postal addresses can be standardized prior to performing block 220. The standardizing can be done to meet a country-specific standard, at least a portion of a postal standard of a country, a postal standard of a region within a country, a commonly-used address format of a country, a commonly-used address format of a region within a country the like, or a practicable combination thereof. The standardizing can be performed to meet a standard format, as described herein.

In optional block 215, at least one component of the one or more postal addresses is removed prior to performing block 220. For example, a numerical street address can be removed from the one or more postal addresses. A postal code can be removed. The removed component can be stored for later use. Thus, a signature set need not be generated for every postal address. One signature set can be generated to cover every postal address on the same street. Removing a numerical component from the first postal address can reduce a volume of data to be compared, and can reduce a quantity of data in data sets. In an example, if there are ten streets, each with 100 houses, then there are 1000 street addresses. Instead of creating 1000 signatures, only 10 signatures are needed—one for each of the ten streets. Thus, when a query is entered (e.g., the method 100 is performed), the one query signature is compared to 10 signatures, instead of 1000 signatures. This technique can advantageously reduce a number of tokens, which reduces signature size. This technique also reduces a number of signatures created for the reference data, which uses less memory and increases start-up time. Further, this technique requires less comparisons to a match a query. Implementing the techniques herein can prepare postal addresses for processing in a manner that maximizes performance and minimizes memory requirements before the postal addresses are processed.

In block 220, a respective token set is formed from at least a portion of each postal address in the one or more postal addresses. The respective token set can be formed at least in part from a street name, a city name, or a combination thereof. Including numerical components in the respective token set of each postal address is optional.

In optional block 225, a misspelling in the one or more postal addresses is corrected prior to creating a respective postal address signature. Optional block 225 can be performed any time after performing block 205 and before performing block 230. In an example, correcting misspellings are limited to certain address components. If two address records are very similar, but valid, a minor correction can be performed to prevent an error. As an example, street types can be changed. For example, given the following addresses:

3) 10 APPLE STREET MARKHAM ON
4) 10 APPLE STRET MARKHAM ON

The misspelling of "stret" is corrected to "street," and both addresses are standardized as 10 APPLE ST MARKHAM ON. Thus, the addresses can be combined, so only one address remains.

However all potential misspellings are not necessarily corrected. As an example, street names need not be changed. For example, given the following addresses:

3) 10 APPLE STREET MARKHAM ON
4) 10 APPLA STREET MARKHAM ON

It is possible that "Appla" is a correct street name, and is not misspelled. In this case, the street name is not changed. Thus, there are two records in this case:

3) 10 APPLE STREET MARKHAM ON
4) 10 APPLA STREET MARKHAM ON

In block 230, a respective postal address signature is created, from the respective token set, for each postal address in the one or more postal addresses. The respective postal address signature can be a fuzzy-token based signature. The respective postal address signature can be a q-gram based signature, with "q" being a number equal to or greater than two. Optionally, the respective postal address signature is a partition-NED based signature. The respective postal address signature can be a Deletion-Based neighborhood generation algorithm-based signature, an A O(log n) Signature-Based String Matching Algorithm-based signature, an AdaptJoin algorithm-based signature, a VChunk algorithm-based signature, a PassJoin algorithm-based signature, a FastSS algorithm-based signature, an ExB: Exclusion-based string matching algorithm-based signature, a Part-Enum algorithm-based signature, a Partition-ED algorithm-based signature, the like, or a combination thereof.

In an example, capital letters can be replaced with lower-case letters to improve a probability of a match. Further, duplicative tokens can be removed from the respective postal address signature to shorten the postal address signature, reduce a data set size, and reduce processing time. In other words, once the respective postal address signature is created, the respective postal address signature can further be pruned to reduce the respective postal address signature's size and thus impact on memory use and processor performance. There are different ways to prune the respective postal address signature to make the respective postal address signature more compact and reduce the computation time. The provided methods and apparatus reduce the size of the respective postal address signature as much as possible, while retaining high accuracy of finding a match.

In an example, tokens in the postal address record can be weighted. Weighting tokens can improve accuracy of a comparison by reducing an impact of commonly occurring tokens on the comparison process. Weighting tokens can increase an impact of rarely occurring tokens on the comparison process. Further, relatively more important tokens can have a higher weight, while less important tokens can have a lower weight.

In block 235, at least one respective postal address in the one or more postal addresses is stored along with each respective postal addresses' respective postal address signature. Optionally, store any respective removed components with the respective postal address signature.

In an example, the one or more postal addresses can be displayed with a video display. The display can depict the one or more postal addresses on a map, in a table, the like, or a combination thereof.

The foregoing blocks are not limiting of the examples. The blocks can be combined and/or the order can be rearranged, as practicable.

An example implementation of the method 200 follows. In this non-limiting example, the following postal addresses are received:

104 Pear Street Markham
94 Apple Street Markham
99 Apple Street Markham
64 Orange Street Markham
65 Orange Street Markham
43 Apple Street Ottawa
99 Orange Street Ottawa
104 Orange Street Ottawa If one of the postal addresses received in block 205 is "Markham 104 Pear Street" then "Markham 104 Pear Street" can be standardized to "104 Pear Street Markham" thus making the postal address "104 Pear Street Markham." The numerical portion "104" can be removed and stored, thus making the postal address "Pear Street Markham." A respective token set can be formed from "Pear Street Markham." In this example, the respective token set is {Pear, Street, Markham}. One or more tokens in the token set can be weighted. If the first postal address included a misspelling such as "Stret" instead of "Street" then the misspelling can be detected and corrected prior to creating the respective postal signature. If a 2-gram set of tokens is prepared, the respective token signatures for the "Pear Street Markham" example are:

"Pear"={Pe, ea, ar}
"Street"={St, tr, re, ee, et}
"Markham"={Ma, ar, rk, kh, ha, am}.

Thus, if a 2-gram set of respective tokens is prepared, the respective postal address signature for "Pear Street Markham" is: {Pe, ea, ar, St, tr, re, ee, et, Ma, ar, rk, kh, ha, am}. The respective postal address signatures for the received postal addresses are:

104 Pear Street Markham={Pe, ea, ar, St, tr, re, ee, et, Ma, ar, rk, kh, ha, am} with a numerical component of 104.

94 Apple Street Markham={Ap, pp, pl, le, St, tr, re, ee, et, Ma, ar, rk, kh, ha, am} with a numerical component of 94.

99 Apple Street Markham={Ap, pp, pl, le, St, tr, re, ee, et, Ma, ar, rk, kh, ha, am} with a numerical component of 99.

64 Orange Street Markham={Or, ra, an, ng, ge, St, tr, re, ee, et, Ma, ar, rk, kh, ha, am} with a numerical component of 64.

65 Orange Street Markham={Or, ra, an, ng, ge, St, tr, re, ee, et, Ma, ar, rk, kh, ha, am} with a numerical component of 65.

43 Apple Street Ottawa={Ap, pp, pl, le, St, tr, re, ee, et, Ot, tt, ta, aw, wa} with a numerical component of 43.

99 Orange Street Ottawa={Or, ra, an, ng, ge, St, tr, re, ee, et, Ot, tt, ta, aw, wa} with a numerical component of 99.

104 Orange Street Ottawa={Or, ra, an, ng, ge, St, tr, re, ee, et, Ot, tt, ta, aw, wa} with a numerical component of 104.

The respective postal address signatures for the one or more postal addresses can be stored as one address corresponding to one signature. In another example, the respective postal address signatures for the one or more postal addresses can be combined (for example one signature per street) and stored as:

Pear Street Markham={Pe, ea, ar, St, tr, re, ee, et, Ma, ar, rk, kh, ha, am} with a numerical component of 104.

Apple Street Markham={Ap, pp, pl, le, St, tr, re, ee, et, Ma, ar, rk, kh, ha, am} with numerical components of 94 and 99.

Orange Street Markham={Or, ra, an, ng, ge, St, tr, re, ee, et, Ma, ar, rk, kh, ha, am} with numerical components of 64 and 65.

Apple Street Ottawa={Ap, pp, pl, le, St, tr, re, ee, et, Ot, tt, ta, aw, wa} with a numerical component of 43.

Orange Street Ottawa={Or, ra, an, ng, ge, St, tr, re, ee, et, Ot, tt, ta, aw, wa} with numerical components of 99 and 104.

FIG. 3 illustrates the example computing device 300 suitable for implementing examples of the presently disclosed subject matter. At least a portion of the methods, sequences, algorithms, steps, or blocks described in connection with the examples disclosed hereby can be embodied directly in hardware, in software executed by a processor (for example, a processor described hereby), or in a combination of the two. In an example, a processor includes multiple discrete hardware components. A software module can reside in a storage medium (for example, a memory device), such as a random-access memory (RAM), a flash memory, a read-only memory (ROM), an erasable programmable read-only memory (EPROM), an electrically erasable programmable read-only memory (EEPROM), a register, a hard disk, a removable disk, a compact disc read-only memory (CD-ROM), a storage medium, the like, or a combination thereof. An example storage medium (for example, a memory device) can be coupled to the processor so the processor can read information from the storage medium, write information to the storage medium, or both. In an example, the storage medium can be integral with the processor.

Further, examples provided hereby are described in terms of sequences of actions to be performed by, for example, one or more elements of a computing device. The actions described hereby can be performed by a specific circuit (for example, an application specific integrated circuit (ASIC)), by program instructions being executed by one or more processors, or by a combination of both. Additionally, a sequence of actions described hereby can be entirely within any form of non-transitory computer-readable storage medium having stored thereby a corresponding set of computer instructions which, upon execution, cause an associated processor (such as a special-purpose processor) to perform at least a portion of a method, a sequence, an algorithm, a step, or a block described hereby. Performing at least a part of a function described hereby can include initiating at least a part of a function described hereby, at least a part of a method described hereby, the like, or a combination thereof. In an example, execution of the stored instructions can transform a processor and any other cooperating devices into at least a part of an apparatus described hereby. A non-transitory (that is, a non-transient) machine-readable media specifically excludes a transitory propagating signal. Additionally, a sequence of actions described hereby can be entirely within any form of non-transitory computer-readable storage medium having stored thereby a corresponding set of computer instructions which, upon execution, configure the processor to create specific logic circuits (for example, one or more tangible electronic circuits configured to perform a logical operation). Thus, examples may be in a number of different forms, all of which have been contemplated to be within the scope of the disclosure.

In an example, when a general-purpose computer (for example, a processor) is configured to perform at least a portion of a method described hereby, then the general-purpose computer becomes a special-purpose computer which is not generic and is not a general-purpose computer. In an example, loading a general-purpose computer with special programming can cause the general-purpose computer to be configured to perform at least a portion of a method, a sequence, an algorithm, a step, or a block described in connection with an example disclosed hereby. In an example, a combination of two or more related method steps disclosed hereby can form a sufficient algorithm. A sufficient algorithm can constitute special programming. Special programming can constitute any software which can cause a computer (for example, a general-purpose computer, a special-purpose computer, etc.) to be configured to perform one or more functions, features, steps algorithms, blocks, or a combination thereof, as disclosed hereby.

The computing device 300 can be, for example, a desktop computer, a laptop computer, a mobile device, the like, or a combination thereof. The computing device 300 can include a processor 305, a bus 310, a memory 315 (such as random-access memory (RAM), read-only memory (ROM), flash RAM, the like, or a combination thereof), a video display 320 (such as a display screen), a user input interface 325 (which can include one or more controllers and associated user input devices such as a keyboard, mouse, touch screen, the like, or a combination thereof), a fixed storage device 330 (such as a hard drive, flash storage, the like, or a combination thereof), a removable media device 335 (operative to control and receive an optical disk, flash drive, the like, or a combination thereof), a network interface 340 operable to communicate with one or more remote devices via a suitable network connection, or a combination thereof. Examples of the disclosed subject matter can be implemented in, and used with, different component and network architectures.

The processor 305 is configured to control operation of the user device 300, including performing at least a part of a method described hereby. The processor 305 can perform logical and arithmetic operations based on processor-executable instructions stored within the memory 315. The processor 305 can execute instructions stored in the memory 315 to implement at least a part of a method described herein (for example, the processing illustrated in FIGS. 1A-2B). The instructions, when executed by the processor 305, can transform the processor 305 into a special-purpose processor that causes the processor to perform at least a part of a function described hereby.

The processor 305 can comprise or be a component of a processing system implemented with one or more processors. The one or more processors can be implemented with a microprocessor, a microcontroller, a digital signal processor, a field programmable gate array (FPGA), a programmable logic device (PLD), an application-specific integrated circuit (ASIC), a controller, a state machine, gated logic, a discrete hardware component, a dedicated hardware finite state machine, any other suitable entity that can at least one of manipulate information (for example, calculating, logical operations, the like, or a combination thereof), control another device, the like, or a combination thereof. The processor 305 may also be referred to as a central processing unit (CPU), a special-purpose processor, or both.

The bus 310 interconnects components of the computing device 300. The bus 310 can enable information communication between the processor 305 and one or more components coupled to the processor 305. The bus system 310 can include a data bus, a power bus, a control signal bus, a status signal bus, the like, or a combination thereof. The components of the computing device 300 can be coupled together to communicate with each other using a different suitable mechanism.

The memory 315, can include at least one of read-only memory (ROM), random access memory (RAM), a flash memory, an erasable programmable read-only memory (EPROM), an electrically erasable programmable read-only memory (EEPROM), a register, other memory, the like, or a combination thereof stores information (for example, data, instructions, software, the like, or a combination thereof) and is configured to provide the information to the processor 305. The RAM can be a main memory configured to store an operating system, an application program, the like, or a combination thereof. The ROM (for example, a flash memory) can be configured to store a basic input-output system (BIOS) which can control basic hardware operation such as the processor's 305 interaction with peripheral components. The memory 310 can also include a non-transitory machine-readable media configured to store software. Software can mean any type of instructions, whether referred to as at least one of software, firmware, middleware, microcode, hardware description language, the like, or a combination thereof. Instructions can include code (for example, in source code format, in binary code format, executable code format, or in any other suitable code format).

The video display 320 can include a component configured to visually convey information to a user of the computing device 300.

The user input interface 325 can include a keypad, a microphone, a speaker, a display, the like, or a combination thereof. The user input interface 325 can include a component configured to convey information to a user of the computing device 300, receive information from the user of the computing device 300, or both.

The fixed storage device 330 can be integral with the computing device 300 or can be separate and accessed through other interfaces. The fixed storage device 330 can be an information storage device which is not configured to be removed during use, such as a hard disk drive.

The removable media device 335 can be integral with the computing device 300 or can be separate and accessed through other interfaces. The removable media device 335 can be an information storage device which is configured to be removed during use, such as a memory card, a jump drive, flash memory, the like, or a combination thereof. Code to implement the present disclosure can be stored in computer-readable storage media such as one or more of the memory 315, the fixed storage device 330, the removable media device 335, a remote storage location, the like, or a combination thereof.

The network interface 340 can electrically couple the computing device 300 to a network and enable exchange of information between the computing device 300 and the network. The network, in turn, can couple the computing device 300 to another electronic device, such as a remote server, a remote storage medium, the like, or a combination thereof. The network can enable exchange of information between the computing device 300 and the electronic device.

The network interface 340 can provide a connection via a wired connection, a wireless connection, or a combination thereof. The network interface 340 can provide such connection using any suitable technique and protocol as is readily understood by one of skill in the art. Example techniques and protocols include digital cellular telephone, Wi-Fi™, Bluetooth®, near-field communications (NFC), the like, and practicable combinations thereof. For example, the network interface 340 can enable the computing device 300 to communicate with other computers via one or more local, wide-area, or other communication networks. Other devices or components (not shown in FIG. 3) (for example, document scanners, digital cameras, and the like) can be coupled via the network interface 340.

All of the components illustrated in FIG. 3 need not be present to practice the present disclosure. Further, the components can be coupled in different ways from that illustrated.

FIG. 4 depicts an example network 400 suitable for implementing examples of the presently disclosed subject matter. The network 400 includes the electronic device 405. The electronic device 405 can include the computing device 200, a local computer, a smart phone, a mobile device, a tablet computer, an electronic device described hereby (as is practicable), the like, or a combination thereof. The electronic device 405 is electrically coupled to a network 410.

The network 410 can be a private network, a local network, a wide-area network, the Internet, any suitable communication network, the like, or a combination thereof. The network 410 can be implemented on any suitable platform including a wired network, a wireless network, an optical network, the like, or a combination thereof.

The network 410 can enable the electronic device 405 to communicate (for example, access) with one or more remote devices, such as the server 415, a database 420, the like, or a combination thereof. In a further example, a remote device can be configured to provide intermediary access, such as where the server 415 is configured to provide access to resources stored in the database 420. The network 410 can enable the electronic device 405 to communicate (for example, access) with the remote platform 425. For example, the remote platform 425 can be a cloud computing arrangement, a search engine, a content delivery system, the like, or a combination thereof. The remote platform 425 can include the server 415, the database 420, the like, or a combination thereof.

All of the components illustrated in FIG. 4 need not be present to practice the present disclosure. Further, the components can be coupled in different ways from that illustrated.

As used hereby, the term "example" means "serving as an example, instance, or illustration." Any example described as an "example" is not necessarily to be construed as preferred or advantageous over other examples. Likewise, the term "examples" does not require all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted the terms "connected," "coupled," and any variant thereof, mean any connection or coupling between elements, either direct or indirect, and can encompass a presence of an intermediate element between two elements which are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, the like, or a combination thereof. The electromagnetic energy can have a wavelength at a radio frequency, a microwave frequency, a visible optical frequency, an invisible optical frequency, the like, or a practicable combination thereof. These are several non-limiting and non-exhaustive examples.

The term "signal" can include any signal such as a data signal, an audio signal, a video signal, a multimedia signal, an analog signal, a digital signal, the like, or a practicable combination thereof. Information and signals described hereby can be represented using any of a variety of different technologies and techniques. For example, data, an instruction, a process step, a process block, a command, information, a signal, a bit, a symbol, the like, or a practicable combination thereof, which are referred to hereby can be represented by a voltage, a current, an electromagnetic wave, a magnetic field, a magnetic particle, an optical field, an optical particle, the like, or a practicable combination thereof, depending at least in part on the particular application, at least in part on a design, at least in part on a corresponding technology, at least in part on like factors, or a practicable combination thereof.

A reference using a designation such as "first," "second," and so forth does not limit either the quantity or the order of those elements. Rather, these designations are used as a convenient method of distinguishing between two or more elements or instances of an element. A reference to first and second elements does not mean only two elements can be employed. A reference to first and second elements does not mean the first element must necessarily precede the second element. Also, unless stated otherwise, a set of elements can comprise one or more elements. In addition, terminology of the form "at least one of: X, Y, or Z" or "one or more of X, Y, or Z," or "at least one of the group consisting of X, Y, and Z" can be interpreted as "X or Y or Z or any combination of these elements." For example, this terminology can include X, or Y, or Z, or X and Y, or X and Z, or X and Y and Z, or 2X, or 2Y, or 2Z, and so on.

The terminology used hereby is for the purpose of describing particular examples and is not intended to be limiting. The singular forms "a," "an," and "the" include the plural forms as well, unless the context clearly indicates otherwise. In other words, the singular can portend the plural, where practicable. The terms "comprises," "comprising," "includes," and "including," specify a presence of a feature, an integer, a step, a block, an operation, an element, a component, the like, or a combination thereof. The terms "comprises," "comprising," "includes," and "including," do not necessarily preclude a presence or an addition of another feature, integer, step, block, operation, element, component, and the like.

In examples, an apparatus disclosed hereby can be at least a part of an electronic device, coupled to an electronic device, or a combination thereof, where the electronic device can be, but is not limited to, a mobile device, a navigation device (for example, a global positioning system receiver, a global navigation satellite system receiver, the like, or a combination thereof), a wireless device, a computer, the like, or a combination thereof.

The term "mobile device" can describe, and is not limited to: a mobile phone, a mobile communication device, a mobile hand-held computer, a portable computer, a tablet computer, a wireless device, a wireless modem, a portable tele-transaction computer (PTC), a data processing device located (e.g., mounted) in a vehicle, the like, or a combination thereof.

Those of skill in the art will appreciate the example functions, methods, logical blocks, modules, circuits, and steps described in the examples disclosed hereby can be implemented as electronic hardware, computer software, or combinations of both, as is practicable. To illustrate this interchangeability of hardware and software, example functions, methods, logical blocks, modules, circuits, and steps have been described hereby generally in terms of their functionality. Whether such functionality is implemented as hardware or software depends upon a particular application and design constraints imposed on an overall system. Skilled artisans can implement the described functionality in different ways for each particular application, but such implementation decisions should not be interpreted as causing a departure from the scope of the present disclosure.

Nothing stated or depicted in this application is intended to dedicate any component, step, block, feature, object, benefit, advantage, or equivalent to the public, regardless of whether the component, step, block, feature, object, benefit, advantage, or the equivalent is recited in the claims. Additionally, conventional elements of the current teachings may not be described in detail, or may be omitted, to avoid obscuring aspects of the current teachings. While this disclosure describes examples, changes and modifications can be made to the examples disclosed hereby without departing from the scope defined by the appended claims. The present disclosure is not intended to be limited to the specifically disclosed examples alone.

What is claimed is:

1. A method performed by one or more processing devices, the method comprising:
receiving a first postal address;
removing at least one component of the first postal address;
forming a token set from at least a portion of the first postal address from which the at least one component was removed, the token set containing at least one duplicate token;
removing the duplicate token from the token set;
creating a postal address signature from the token set having the duplicate token removed, wherein the postal address signature is a fuzzy-token based signature;
identifying a matching signature by comparing the postal address signature to at least one stored signature among a plurality of stored signatures;
identifying a second postal address corresponding to the matching signature; and
identifying a match by comparing the first postal address containing the at least one component and the second postal address.

2. The method of claim 1, wherein the at least one component of the first postal address is a street address, a postal code, or a combination thereof.

3. The method of claim 2, wherein the postal code is one or more of: a zip code, a postcode, a codes postaux, a post code, an Eircode, a postal routing number, a Postal Index Number, a Codice di Avviamento Postale, a Codigo de Enderecamento Postal, a Postleitzahl, a postal zone code, or a postal district code.

4. The method of claim 1, wherein the token set is formed at least in part from a street name, a city name, or a combination of the street name and the city name.

5. The method of claim 1, further comprising correcting a misspelling in the first postal address prior to creating the postal address signature.

6. The method of claim 1, further comprising standardizing, prior to creating the token set, a component in the first postal address.

7. The method of claim 6, wherein the standardizing is done to a country-specific standard.

8. The method of claim 1, wherein the postal address signature is a q-gram based signature and "q" is a number equal to two or greater than two, a Deletion-Based neighborhood generation algorithm-based signature, an A O(log n) Signature-Based String Matching Algorithm-based signature, an AdaptJoin algorithm-based signature, a VChunk algorithm-based signature, a PassJoin algorithm-based signature, a FastSS algorithm-based signature, an ExB: Exclusion-based string matching algorithm-based signature, a Part-Enum algorithm-based signature, a Partition-ED algorithm-based signature, or a Partition-NED algorithm-based signature.

9. The method of claim 1, further comprising receiving the first postal address via a computer network, from at least one of: computer, a mobile device, a wearable device, or a cloud-based computer network.

10. The method of claim 1, wherein the method is performed as at least a part of an address cleansing process, an address validating process, a data cleansing process, or a data integration process.

11. The method of claim 1, further comprising weighting one or more tokens in the token set.

12. An apparatus comprising:
a processing device; and
memory storing instruction that are executable to cause the processing device to perform operations comprising:
receiving a first postal address;
removing at least one component of the first postal address;
forming a token set from at least a portion of the first postal address from which the at least one component was removed, the token set containing at least one duplicate token;
creating a postal address signature from the token set having the duplicate token removed, wherein the postal address signature is a fuzzy-token based signature;
identifying a matching signature by comparing the postal address signature to at least one stored signature among a plurality of stored signatures;
identifying a second postal address corresponding to the matching signature; and
identifying a match by comparing the first postal address containing the at least one component and the second postal address.

13. The apparatus of claim 12, further comprising a computing device with which the processor is integrated.

14. The apparatus of claim 12, wherein the processing device comprises one or more of is a microprocessor, a microcontroller, a digital signal processor, a field programmable gate array, a programmable logic device, an application-specific integrated circuit, a controller, a non-generic special-purpose processor, a state machine, a gated logic device, a discrete hardware component, or a dedicated hardware finite state machine.

15. The apparatus of claim 12, wherein the operations comprise standardizing, prior to creating the token set, a component in the first postal address.

16. One or more non-transitory computer-readable media storing instructions that are executable to cause one or more processing devices to perform operations comprising:
receiving a first postal address;
removing at least one component of the first postal address;
forming a token set from at least a portion of the first postal address from which the at least one component was removed, the token set containing at least one duplicate token;
creating a postal address signature from the token set having the duplicate token removed, wherein the postal address signature is a fuzzy-token based signature;
identifying a matching signature by comparing the postal address signature to at least one stored signature among a plurality of stored signatures;
identifying a second postal address corresponding to the matching signature; and
identifying a match by comparing the first postal address containing the at least one component and the second postal address.

17. The one or more non-transitory computer-readable media of claim 16, wherein the at least one component of the first postal address is a street address, a postal code, or a street address and a postal code.

18. The one or more non-transitory computer-readable media of claim 16, wherein identifying the match further comprises comparing the at least one removed component to a corresponding component of the second postal address.

19. The method of claim 16, further comprising correcting a misspelling in the first postal address prior to creating the postal address signature.

20. The method of claim 16, further comprising standardizing, prior to creating the token set, a component in the first postal address.

* * * * *